US012803674B2

(12) United States Patent
Wang et al.

(10) Patent No.: US 12,803,674 B2
(45) Date of Patent: Nov. 17, 2026

(54) MULTI-MODULATION-FORMAT COMPATIBLE SPACE LASER COMMUNICATION METHOD AND SYSTEM BASED ON DIRECT MODULATION

(71) Applicant: XI'AN INSTITUTE OF OPTICS AND PRECISION MECHANICS, CHINESE ACADEMY OF SCIENCES, Xi'an (CN)

(72) Inventors: Wei Wang, Xi'an (CN); Duorui Gao, Xi'an (CN); Xiaoping Xie, Xi'an (CN)

(73) Assignee: XI'AN INSTITUTE OF OPTICS AND PRECISION MECHANICS, CHINESE ACADEMY OF SCIENCES, Xi'an (CN)

( * ) Notice: Subject to any disclaimer, the term of this patent is extended or adjusted under 35 U.S.C. 154(b) by 245 days.

(21) Appl. No.: 18/712,997

(22) PCT Filed: Nov. 25, 2022

(86) PCT No.: PCT/CN2022/134382
§ 371 (c)(1),
(2) Date: May 23, 2024

(87) PCT Pub. No.: WO2023/093856
PCT Pub. Date: Jun. 1, 2023

(65) Prior Publication Data

US 2025/0023643 A1 Jan. 16, 2025

(30) Foreign Application Priority Data

Nov. 25, 2021 (CN) .......................... 202111411623.4

(51) Int. Cl.
*H04B 10/548* (2013.01)
*H04B 10/118* (2013.01)
(Continued)

(52) U.S. Cl.
CPC ......... *H04B 10/548* (2013.01); *H04B 10/118* (2013.01); *H04B 10/504* (2013.01); *H04J 14/02* (2013.01)

(58) Field of Classification Search
CPC .. H04B 10/548; H04B 10/118; H04B 10/504; H04J 14/02
See application file for complete search history.

(56) References Cited

U.S. PATENT DOCUMENTS

2005/0013618 A1 1/2005 Kurebayashi

FOREIGN PATENT DOCUMENTS

CN 105871499 A * 8/2016 .......... H04J 14/0278
CN 106533562 A 3/2017
CN 114430298 A 5/2022

OTHER PUBLICATIONS

Cano et al., "Flexible D(Q)PSK 1.25-5 GB/s UDWDM-PON with directly modulated DFBs and centralized polarization scrambling" (published in 2015 European Conference on Optical Communication (ECOC), Oct. 2015).*

* cited by examiner

*Primary Examiner* — Casey L Kretzer
(74) *Attorney, Agent, or Firm* — NKL Law; Allen Xue

(57) ABSTRACT

Provided are a multi-modulation-format compatible space laser communication method and system based on direct modulation, which solve the problems that an existing coherent laser communication system is poor in compatibility and expandability and complex in structure. The method includes the following steps of: 1) generating a plurality of driving signals and outputting a plurality of direct-current bias voltages and synchronous clocks; outputting, by lasers, high-speed optical signals, filtering out frequencies corresponding to low-level signals and retaining phase-stable optical signals; multiplexing all the high-speed optical sig-
(Continued)

nals into one ultra-high-speed optical signal; 2) receiving the ultra-high-speed optical signal and inputting the ultra-high-speed optical signal to a 90° optical hybrid; performing, coherent mixing to output four ultra-high-speed mixed optical signals which are received by four optical demultiplexers; and receiving, by a plurality of balanced photoelectric detector groups, one high-speed mixed optical signal, and correspondingly outputting high-speed electrical signals.

7 Claims, 4 Drawing Sheets

(51) Int. Cl.

| | |
|---|---|
| ***H04B 10/50*** | (2013.01) |
| ***H04J 14/02*** | (2006.01) |

MULTI-MODULATION-FORMAT COMPATIBLE SPACE LASER COMMUNICATION METHOD AND SYSTEM BASED ON DIRECT MODULATION

TECHNICAL FIELD

The present disclosure belongs to the field of space laser communication, in particular to a multi-modulation-format compatible space laser communication method and system based on direct modulation.

BACKGROUND

Space laser communication, by virtue of its bandwidth advantages and no electromagnetic spectrum constraints, has become an important means to solve the bandwidth bottleneck of microwave communication, build a space-based broadband information network, and realize real-time transmission of massive data of earth observation. With the characteristics of small size, light weight and low power consumption, space laser communication terminals are very suitable as a satellite payload and can meet the growing communication needs of space activities.

In recent years, emerging low-earth orbit (LEO) satellite communication constellations such as OneWeb, StarLink, "Hongyan" and "Xingyun" have developed rapidly. Some research organizations have carried out comprehensive and in-depth research on the key technologies of space laser communication systems, developed several satellite laser communication systems, and completed a number of in-orbit demonstration experiments. The technology is basically mature, and they are beginning to plan and build a space-based laser communication network covering the whole world.

In the future, each communication satellite will carry multiple laser communication terminals, which can serve multiple different types of targets at the same time, so the laser communication terminals will develop towards miniaturization, integration and multi-modulation-format compatibility. For long-distance space communication, the communication modulation format usually adopts coherent modulation to transmit information, where Binary Phase-Shift Keying (BPSK) and Quadrature Phase-Shift Keying (QPSK) are the main modulation formats of space coherent communication.

The traditional coherent laser communication system usually uses $LiNbO_3$ external modulation to realize the phase modulation of optical signals. The optical transmission system is composed of several independent components, such as lasers, modulators, drivers and amplifiers. The system is complex in structure and poor in compatibility and expandability.

SUMMARY

In order to solve the technical problems that the existing coherent laser communication system can only realize modulation and demodulation of a single signal format, the system is poor in compatibility and expandability, and complex in structure, the present disclosure provides a multi-modulation-format compatible space laser communication method and system based on direct modulation.

To achieve the above objective, the technical solutions provided by the present disclosure are:

A multi-modulation-format compatible space laser communication method based on direct modulation, including the steps of:

1) high-speed optical signal transmission 1.1) receiving a plurality of high-speed electrical signals, and processing the plurality of high-speed electrical signals respectively to generate a plurality of driving signals capable of realizing phase signal modulation, and outputting a plurality of direct-current bias voltages and a plurality of synchronous clocks; driving a plurality of lasers after an addition operation is performed on the direct-current bias voltages and the plurality of synchronous clocks respectively; wherein the number of the lasers, the number of the driving signals, the number of the direct-current bias voltages and the number of the synchronous clocks are all equal to the number of the high-speed electrical signals, and the lasers, the driving signals, the direct-current bias voltages and the synchronous clocks are in one-to-one correspondence;

1.2) generating, by each laser, adiabatic chirp according to changes in the corresponding driving signal to cause frequency modulation to realize the phase modulation of optical signals according to the frequency modulation, and outputting the modulated high-speed optical signals;

1.3) filtering out frequencies corresponding to low-level signals in all the modulated high-speed optical signals;

1.4) retaining phase-stable optical signal waveforms in the modulated high-speed optical signals according to the synchronous clocks;

1.5) multiplexing all the high-speed optical signals into one ultra-high-speed optical signal, and coupling the ultra-high-speed optical signal to space;

2) high-speed optical signal reception 2.1) receiving the ultra-high-speed optical signal, after long-distance transmission, from the space, filtering out a plurality of optical signals from the ultra-high-speed optical signal, and inputting the ultra-high-speed optical signal to a 90° optical hybrid;

2.2) performing, by the 90° optical hybrid, coherent mixing on the ultra-high-speed optical signal from which the plurality of optical signals are filtered out and multiplexed local oscillator light to output four ultra-high-speed mixed optical signals with phases of 0°, 90°, 180° and 270°; wherein the multiplexed local oscillator light is formed by outputting multiple paths of local oscillator light by a plurality of local oscillator lasers and multiplexing the multiple paths of local oscillator light according to different wavelengths; the number of the local oscillator lasers is equal to the number of the high-speed electrical signals in step 1.1);

2.3) receiving, by four optical demultiplexers, four ultra-high-speed mixed optical signals with phases of 0°, 90°, 180° and 270° respectively, and demultiplexing each ultra-high-speed mixed optical signal into a plurality of high-speed mixed optical signals according to different wavelengths; wherein the number of the plurality of high-speed mixed optical signals is equal to the number of the high-speed electrical signals in step 1.1);

2.4) receiving, by a plurality of balanced photodetector groups, one high-speed mixed optical signal from the four optical demultiplexers respectively, performing photoelectric conversion on the high-speed mixed optical signals and outputting corresponding mixed electrical signals; wherein the number of the balanced photodetector groups is equal to the number of the high-speed electrical signals in step 1.1);

2.5) converting the mixed electrical signals output by the plurality of balanced photodetector groups into digital signals respectively, processing, by a digital signal processor, the digital signals to recover baseband electrical signals, and outputting high-speed electrical signals; wherein the digital signal processor also obtains an error signal according to a frequency difference after the ultra-high-speed optical signal is mixed with the multiplexed local oscillator light;

2.6) adjusting the central wavelengths of the local oscillator lasers in step 2.2) according to the error signal, so that the digital signal processor outputs an error-compensated high-speed electrical signal.

Further, in step 1.5), the ultra-high-speed optical signal is subjected to power amplification, and the ultra-high-speed optical signal subjected to power amplification is coupled to the space through an optical antenna.

Further, step 2.1) specifically includes: receiving the ultra-high-speed optical signal, after long-distance inter-satellite or satellite-to-ground transmission, from the space through the optical antenna, performing low-noise and high-gain amplification on the ultra-high-speed optical signal and then inputting the ultra-high-speed optical signal subjected to low-noise and high-gain amplification to the 90° optical hybrid.

Further, in step 2.2), the phases of ultra-high-speed mixed optical signals with phases of 0° and 180° are in-phase, and the phases of ultra-high-speed mixed optical signals with phases of 90° and 270° are in quadrature.

Meanwhile, the present disclosure also provides a multi-modulation-format compatible space laser communication system based on direct modulation, including a transmitting unit and a receiving unit;

the transmitting unit includes m signal processors, m lasers, m optical filters, m pulse shearers and a first optical multiplexer, wherein m is an integer greater than 1;

the m signal processors are configured to receive m high-speed electrical signals, process the high-speed electrical signals to generate driving signals capable of implementing phase signal modulation, and output direct-current bias voltages and synchronous clocks;

the m lasers are configured to generate adiabatic chirp according to the corresponding driving signals and direct-current bias voltages to cause frequency modulation, and perform phase modulation according to the frequency modulation to output modulated high-speed optical signals;

the m optical filters are configured to filter out frequencies corresponding to low-level signals in the modulated high-speed optical signals;

the m pulse shearers are configured to receive the high-speed optical signals processed by the corresponding optical filters, delete phase-fluctuating optical signal waveforms according to the synchronous clocks and retain m phase-stable optical signals;

the first optical multiplexer is configured to multiplex the optical signals output by the m pulse shearers into one ultra-high-speed optical signal and couple the ultra-high-speed optical signal to space;

the receiving unit includes a periodic optical filter, a 90° optical hybrid, four optical demultiplexers, m balanced photodetector groups, m groups of analog-to-digital converters, a digital signal processor, a second optical multiplexer, m local oscillator lasers and a Doppler shift compensator; wherein the periodic optical filter is configured to filter out m optical signals from the ultra-high-speed optical signal received from the space and input the ultra-high-speed optical signal from which the m optical signals are filtered out to the 90° optical hybrid;

the m local oscillator lasers are configured to output m paths of local oscillator light;

the second optical multiplexer is configured to multiplex the m paths of local oscillator light into one path of local oscillator light according to different wavelengths and input the multiplexed local oscillator light to the 90° optical hybrid;

the 90° optical hybrid is configured to perform coherent mixing on the ultra-high-speed optical signal from which the m optical signals are filtered out and the multiplexed local oscillator light formed by multiplexing the m paths of local oscillator light to output four ultra-high-speed mixed optical signals with phases of 0°, 90°, 180° and 270°;

the four optical demultiplexers are configured to receive four ultra-high-speed mixed optical signals with phases of 0°, 90°, 180° and 270° respectively, wherein each optical demultiplexer is configured to demultiplex the received ultra-high-speed mixed optical signal into m high-speed mixed optical signals according to different wavelengths;

the m balanced photodetector groups are configured to receive one high-speed mixed optical signal from the four optical demultiplexers respectively, perform photoelectric conversion on the high-speed mixed optical signals and output corresponding mixed electrical signals;

the m groups of analog-to-digital converters are configured to convert the mixed electrical signals output by the plurality of balanced photodetector groups into digital signals respectively, send the digital signals to the digital signal processor, process the digital signals to recover baseband electrical signals, and output high-speed electrical signals;

the digital signal processor is configured to obtain an error signal according to a frequency difference after the ultra-high-speed optical signal is mixed with the multiplexed local oscillator light;

the Doppler shift compensator is configured to adjust the center wavelengths of the local oscillator lasers according to the error signal.

Further, the four optical demultiplexers are respectively a first optical demultiplexer, a second optical demultiplexer, a third optical demultiplexer and a fourth optical demultiplexer, and are configured to respectively receive the four ultra-high-speed mixed optical signals with phases of 0°, 90°, 180° and 270° respectively;

each balanced photodetector group includes a first balanced photodetector and a second balanced photodetector;

the first balanced photodetectors of the m balanced photodetector groups are configured to respectively receive m high-speed mixed optical signals output by the first optical demultiplexer and m high-speed mixed optical signals output by the third optical demultiplexer and convert the high-speed mixed optical signals into high-speed mixed electrical signals for output;

the second balanced photodetectors of the m balanced photodetector groups are configured to respectively receive m high-speed mixed optical signals output by the second optical demultiplexer and m high-speed mixed optical signals output by the fourth optical demultiplexer and convert the high-speed mixed optical signals into high-speed mixed electrical signals for output.

Further, the transmitting unit further includes a first optical amplifier and a first optical antenna; wherein the first optical amplifier is configured to perform power amplification on the ultra-high-speed optical signal output by the first optical multiplexer, and input the ultra-high-speed optical signal subjected to power amplification to the first optical antenna; the first optical antenna is configured to couple the ultra-high-speed optical signal subjected to power amplification to space;

the receiving unit further includes a second optical amplifier and a second optical antenna; the second optical antenna is configured to receive the ultra-high-speed optical signal multiplexed by the first optical multiplexer from the space; the second optical amplifier is configured to perform low-noise and high-gain amplification on the ultra-high-speed optical signal received by the second optical antenna, and input the ultra-high-speed optical signal subjected to low-noise and high-gain amplification to the periodic optical filter.

Compared with the prior art, the present disclosure has the advantages that:

1, the present disclosure utilizes the chirp effect of the laser, and the phase shift of the optical field is produced by controlling the magnitude of the injected current. The phase encoding of the signal is also achieved, resulting in a corresponding phase change of the signal to realize the phase advantages of simple structure, small size, light weight, low cost, and can better adapt to ever miniaturized, integrated optical communication networks.

2, the present disclosure is compatible with communication modulation formats such as BPSK/QPSK/8PSK/ . . . /$2^n$PSK, and can effectively increase the compatibility of modulation formats of satellite laser communication systems.

3, the present disclosure greatly improves the communication rate through wavelength-division multiplexing technology, and is suitable for future ultra-high-speed laser communication networks of 100 Gbps magnitude.

DETAILED DESCRIPTION

The present disclosure will be described in further detail below with reference to the accompanying drawings and specific embodiments.

A multi-modulation-format compatible space laser communication system based on direct modulation of the present disclosure includes a transmitting unit and a receiving unit.

Figure 1:
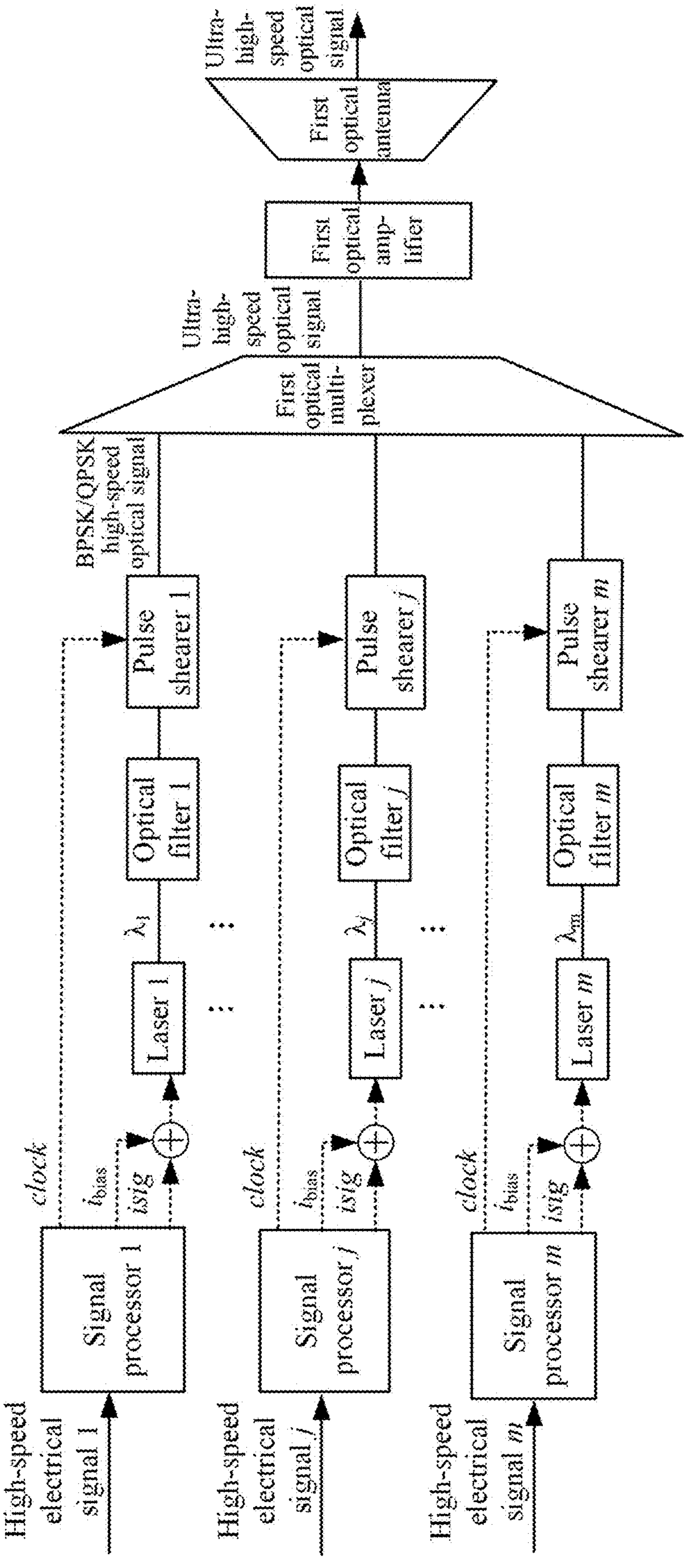
FIG. 1 is a schematic diagram of the principle structure of a transmitting unit in a multi-modulation-format compatible space laser communication system based on direct modulation according to the present disclosure.

As shown in FIG. 1, the transmitting unit includes m signal processors, m lasers, m optical filters, m pulse shearers, a first optical multiplexer, a first optical amplifier and a first optical antenna, wherein m is an integer greater than 1; driving signal outputs of the m signal processors are respectively connected to signal inputs of the m lasers, clock signal outputs of the m signal processors are respectively connected to clock signal inputs of the m pulse shearers, signal outputs of the m lasers are respectively connected to signal inputs of the m optical filters, signal outputs of the m optical filters are respectively connected to signal inputs of the m pulse shearers, signal outputs of the m pulse shears are all connected to a signal input of the first optical multiplexer, and a signal output of the first optical multiplexer is connected to the first optical antenna through the first optical amplifier. The signal processors are configured to receive high-speed electrical signals, and process the high-speed electrical signals to generate driving signals for realizing phase signal modulation. Each signal processor can receive one or more high-speed electrical signals, process the received one or more high-speed electrical signals, and then output at least one driving signal as required.

Figure 2:
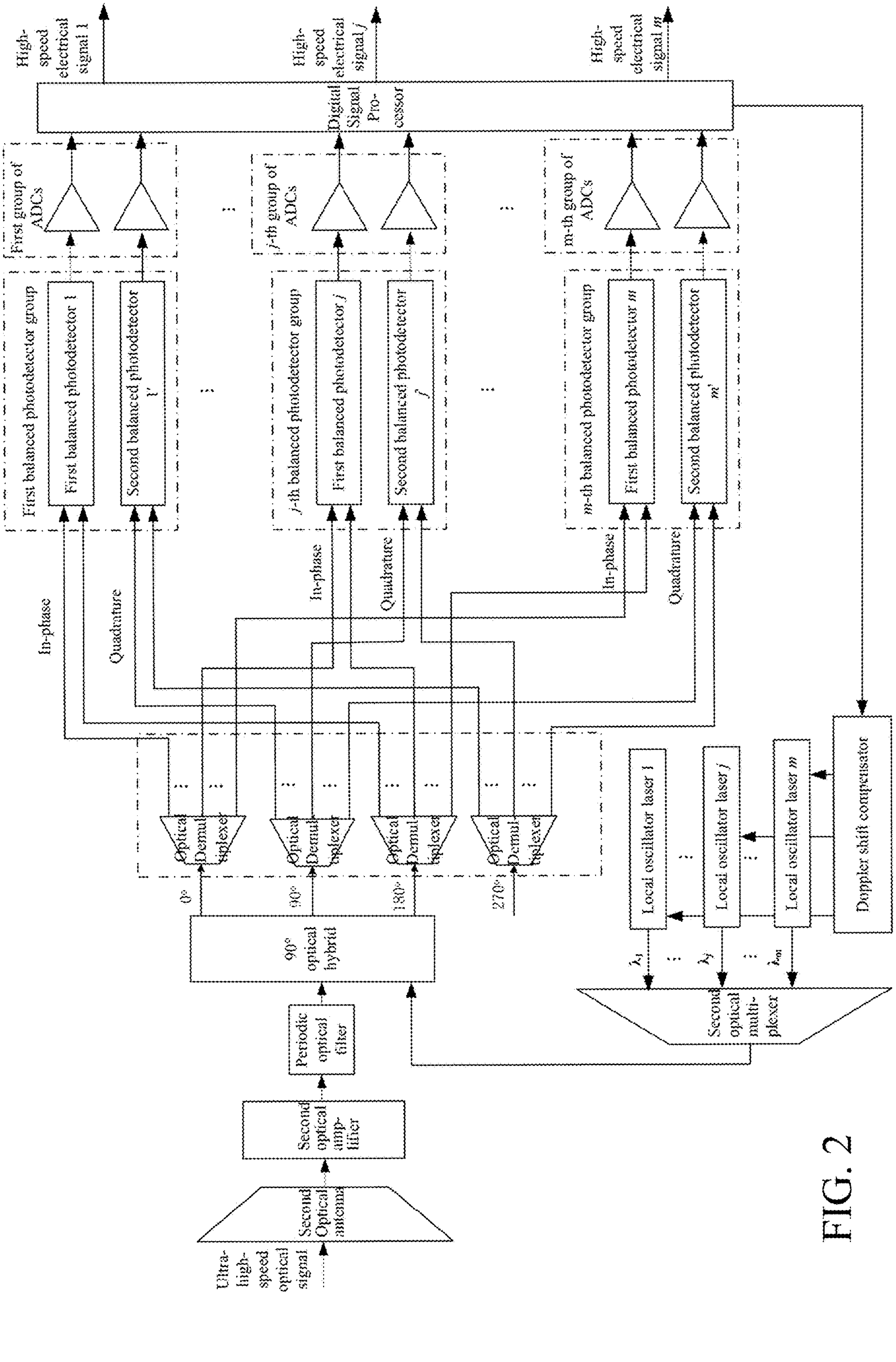
FIG. 2 is a schematic diagram of the principle structure of a receiving unit in a multi-modulation-format compatible space laser communication system based on direct modulation according to the present disclosure.

As shown in FIG. 2, the receiving unit includes a second optical antenna, a second optical amplifier, a periodic optical filter, a 90° optical hybrid, four optical demultiplexers, m balanced photodetector groups, m groups of analog-to-digital converters, a digital signal processor, a second optical multiplexer, m local oscillator lasers and a Doppler shift compensator; wherein a signal output of the second optical antenna is connected to a signal input of the periodic optical filter through the second optical amplifier, a signal output of the periodic optical filter is connected to an optical signal input of the 90° optical hybrid, signal outputs of the 90° optical hybrid are respectively connected to signal inputs of the four optical demultiplexers, signal outputs of the four optical demultiplexers are connected to signal inputs of the m balanced photodetector groups, signal outputs of the m balanced photodetector groups are respectively connected to signal inputs of the m groups of analog-to-digital converters, signal outputs of the m groups of analog-to-digital converters are all connected to a signal input of the digital signal processor; a signal input of the Doppler shift compensator is connected to the digital signal processor, signal outputs of the Doppler shift compensator are respectively connected to signal inputs of the m local oscillator lasers, signal outputs of the m local oscillator lasers are all connected to a signal input of the second optical multiplexer, and a signal output of the second optical multiplexer is connected to a local oscillator optical signal input of the 90° optical hybrid. Each balanced photodetector group includes two balanced photodetectors, and each group of analog-to-digital converters (each group of ADCs) includes two analog-to-digital converters respectively cooperating with the two balanced photodetectors.

The present disclosure utilizes the chirp effect of the laser, and the phase shift of the optical field is produced by controlling the magnitude of the injected current. The phase encoding of the signal is also achieved, resulting in a corresponding phase change of the signal to realize the phase advantages of smaller size, lower power consumption, lower equipment complexity, higher compatibility and lower cost, and can better adapt to ever miniaturized, integrated optical communication networks.

Meanwhile, the signal processor of the present disclosure receives the high-speed electrical signal, and the high-speed electrical signal can be processed in the electrical domain according to the signal modulation format requirements to generate 3-level signals/5-level signals/7-level signals, so as to drive the laser to realize phase modulation signals such as BPSK/QPSK/8PSK/ . . . /$2^n$PSK, so the present disclosure is compatible with communication modulation formats such as BPSK/QPSK/8PSK/ . . . /$2^n$PSK.

Embodiment 1

This embodiment takes the BPSK communication modulation format as an example, and the working process of the multi-modulation-format compatible space laser communication system is as follows:

1) high-speed optical signal transmission (working process of transmitting unit)

Figure 3:
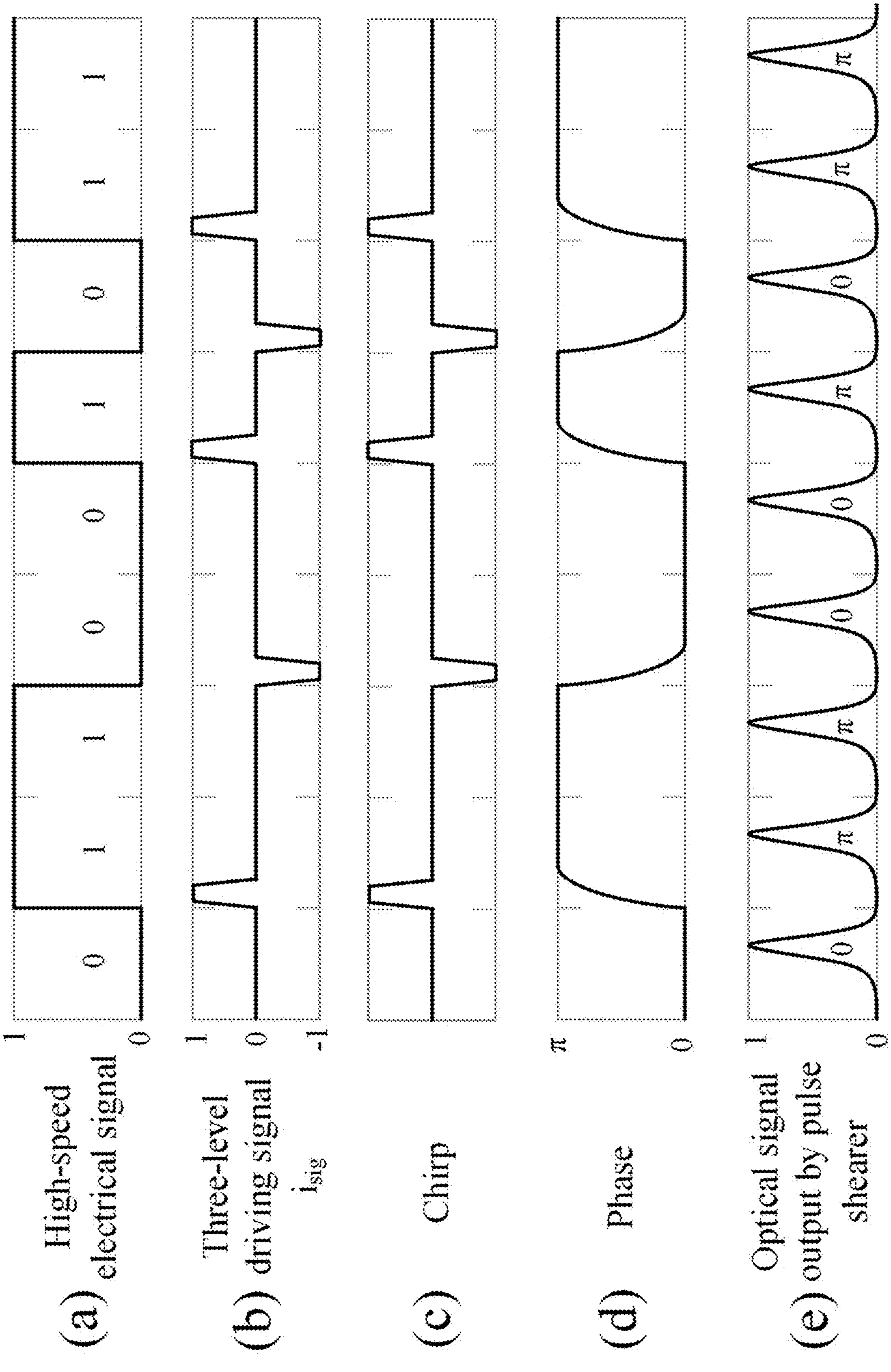
FIG. 3 is a waveform diagram of a process of processing a high-speed electrical signal by a transmitting unit in Embodiment 1 of the present disclosure.

1.1) each signal processor receives an n Gbps high-speed electrical signal, wherein the high-speed electrical signal is as shown in (a) in FIG. 3; each signal processor performs high-pass filtering or digital processing on the received n Gbps high-speed electrical signal to generate a three-level AC-coupled driving signal $i_{sig}$ for direct modulation, as shown in (b) in FIG. 3. At the same time, each signal processor outputs a DC bias voltage $i_{bias}$ and a synchronous clock clock, the DC bias voltage $i_{bias}$ provides a bias voltage under which the corresponding laser can work, and each laser is driven after an addition operation is performed on the bias voltage and the driving signal $i_{sig}$.

1.2) each laser generates adiabatic chirp according to changes in the corresponding driving signal $i_{sig}$, to cause frequency modulation, with frequency modulation $\Delta f(t)=\gamma\Delta i(t)$, where $\gamma$ is the chirp coefficient of frequency modulation, and the frequency change is shown in (c) in FIG. 3; the frequency change causes the phase change $\Delta\Phi=2\pi\int\Delta f(t)dt=2\pi\gamma\int\Delta i(t)dt$, and the phase shifts are 0 and $\pi$ respectively, as shown in (d) in FIG. 3, so that the phase modulation of the optical signals is realized, and BPSK high-speed optical signals are output.

1.3) the optical filters make the frequencies corresponding to the high-level signals in the modulated BPSK high-speed optical signals approach the transmission peak, and filter out the frequencies corresponding to the low-level signals, thus improving the extinction ratio of the signals.

1.4) each pulse shearer is driven by an n GHz clock signal clock, which is synchronized with the driving signal $i_{sig}$, and functions to: (1) retain optical signal waveforms at the end of the symbol, the optical phase information within the symbol being fully concentrated at the end of the symbol; and (2) delete unwanted waveforms at the beginning of the symbol, including phase and power fluctuations that degrade performance. That is, the pulse shearers are configured to delete phase-fluctuating optical signal waveforms and retain phase-stable optical signal waveforms, and the optical signal output by the pulse shear is shown in (e) in FIG. 3;

1.5) the first optical multiplexer multiplexes m n Gbps BPSK high-speed optical signals equally spaced and adjacent in frequency (25 GHz or 50 GHz or 100 GHz . . . ) output by m pulse shearers into one m×n Gbps ultra-high-speed optical signal according to different wavelengths.

1.6) the first optical amplifier performs power amplification on the input m×n Gbps ultra-high-speed optical signal to meet the optical power requirements of long-distance transmission in space.

1.7) the first optical antenna couples the ultra-high-speed optical signal (fiber optic signal) subjected to power amplification into the space for transmission;

2) high-speed optical signal reception (working process of receiving unit)

2.1) the second optical antenna receives the ultra-high-speed optical signal after long-distance inter-satellite and satellite-to-ground transmission and couples the ultra-high-speed optical signal to the optical fiber.

2.2) the second optical amplifier performs low-noise and high-gain amplification on the ultra-high-speed optical signal coupled to the optical fiber to meet the optical power requirements of back-end detection.

2.3) the periodic optical filter filters out m optical signals at m adjacent frequencies (25 GHz or 50 GHz or 100 GHz . . . ) at equal intervals from the ultra-high-speed optical signal transmitted by the transmitting unit.

2.4) the 90° optical hybrid is configured to perform coherent mixing on the ultra-high-speed optical signal and multiplexed local oscillator light to output four ultra-high-speed mixed optical signals with phases of in-phase 0° and 180°, and quadrature 90° and 270° respectively, and send the ultra-high-speed mixed optical signals with phases of 0°, 180°, 90° and 270° to the four optical demultiplexers respectively; wherein the multiplexed local oscillator light is formed by outputting m paths of local oscillator light by m local oscillator lasers and multiplexing the m paths of local oscillator light according to different wavelengths;

2.5) the four optical demultiplexers are respectively a first optical demultiplexer, a second optical demultiplexer, a third optical demultiplexer and a fourth optical demultiplexer, and are configured to respectively receive the four ultra-high-speed mixed optical signals with phases of 0°, 180°, 90° and 270°; each optical demultiplexer demultiplexes the received m×n Gbps ultra-high-speed mixed optical signal into m n Gbps high-speed mixed optical signals according to different wavelengths;

2.6) each balanced photodetector group includes a first balanced photodetector and a second balanced photodetector; the first balanced photodetectors of the m balanced photodetector groups are configured to respectively receive m high-speed mixed optical signals (high-speed mixed optical signals with a phase of) 0° output by the first optical demultiplexer and m high-speed mixed optical signals (high-speed mixed optical signals with a phase of) 180° output by the third optical demultiplexer and convert the high-speed mixed optical signals into high-speed mixed electrical signals for output; the second balanced photodetectors of the m balanced photodetector groups are configured to respectively receive m high-speed mixed optical signals (high-speed mixed optical signals with a phase of) 90° output by the second optical demultiplexer and m high-speed mixed optical signals (high-speed mixed optical signals with a phase of) 270° output by the fourth optical demultiplexer and convert the high-speed mixed optical signals into high-speed mixed electrical signals for output;

2.7) each analog-to-digital converter (ADC) is configured to convert the high-speed mixed electrical signal output by the corresponding balanced photodetector group into a digital signal;

2.8) the digital signal processor receives the digital signal output by the analog-to-digital converter, and performs processing such as front-end compensation, timing recovery, polarization tracking, frequency estimation, phase estimation, and decision to recover a baseband electrical signal, and outputs a high-speed electrical signal;

the digital signal processor also obtains an error signal according to a frequency difference after the ultra-high-speed optical signal is mixed with the multiplexed local oscillator light;

2.9) the Doppler shift compensator adjusts the central wavelengths of the local oscillator lasers to compensate the optical wavelength drift of the transmitting unit caused by the inter-satellite and satellite-to-ground Doppler shift according to the error signal obtained by the digital signal processor;

2.10) the second optical multiplexer multiplexes the m paths of local oscillator light output by the m local oscillator lasers into one path of multiplexed local oscillator light according to different wavelengths, inputs the multiplexed local oscillator light into the 90° optical hybrid, and provides the local oscillator light corresponding to signal light to the 90° optical hybrid, so that the digital signal processor outputs an error-compensated high-speed electrical signal.

Embodiment 2

This embodiment takes the QPSK communication modulation format as an example, and the working process of the multi-modulation-format compatible space laser communication system is as follows:

1) high-speed optical signal transmission (working process of transmitting unit)

Figure 4:
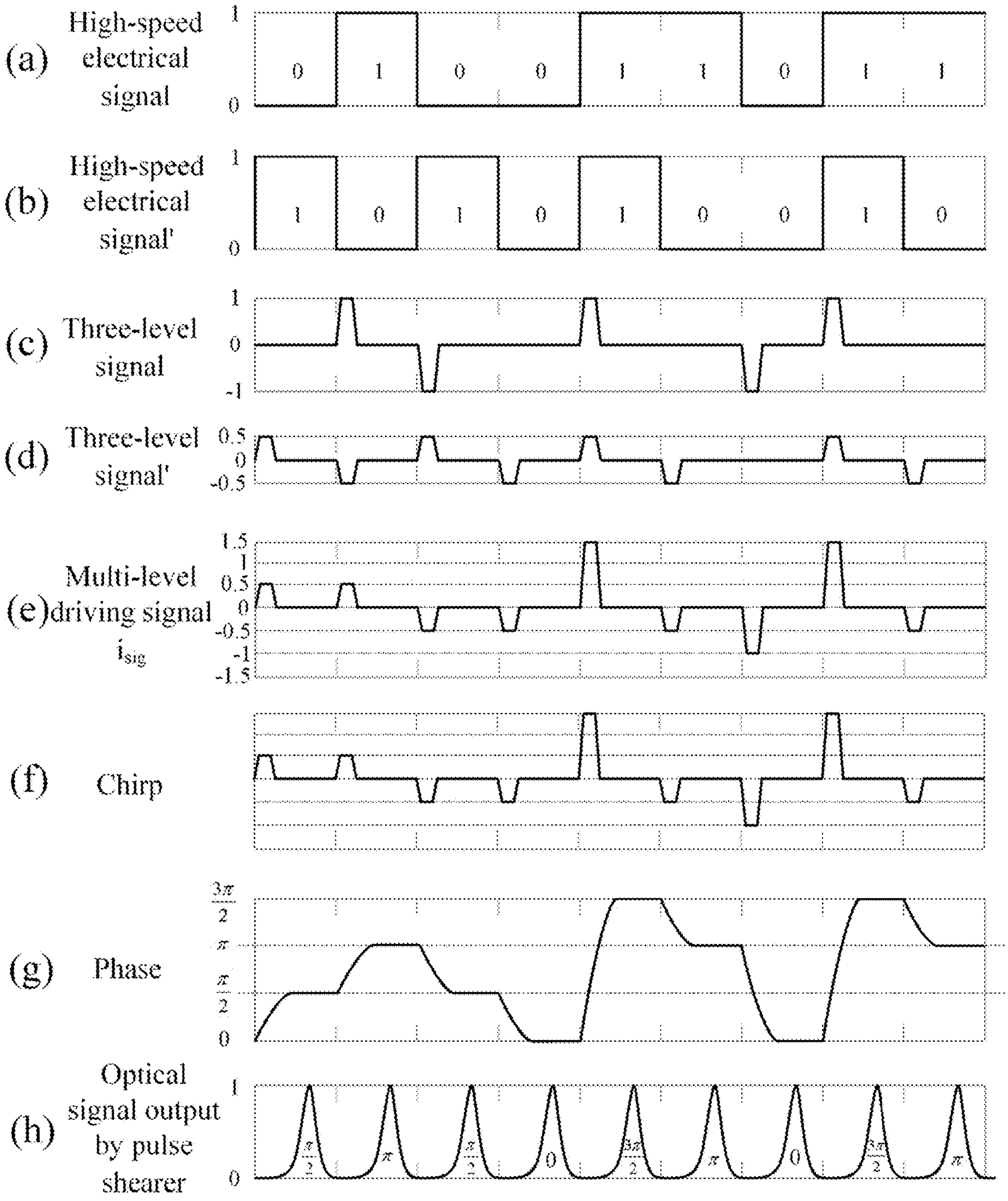
FIG. 4 is a waveform diagram of a process of processing a high-speed electrical signal by a transmitting unit in Embodiment 2 of the present disclosure.

1.1) each signal processor receives an n Gbps high-speed electrical signal, which is internally divided into a "high-speed electrical signal" with the rate of n/2 Gbps and a "high-speed electrical signal" with the rate of n/2 Gbps, which are as shown in (a) and (b) in FIG. 4; the two n/2 Gbps high-speed electrical signals are then subjected to high-pass filtering or digital processing respectively to generate three-level AC-coupled signals, wherein the amplitude of one three-level AC coupled signal ("three-level signal") is half the amplitude of the other three-level AC coupled signal ("three-level signal"), as shown in (c) and (d) in FIG. 4. The two three-level AC coupled signals ("three-level signal" and "three-level signal") are subjected to an addition operation to generate a directly modulated multi-level driving signal $i_{sig}$, as shown in (e) in FIG. 4. At the same time, each signal processor outputs a DC bias voltage $i_{bias}$ and a synchronous clock clock, the DC bias voltage $i_{bias}$ provides a bias voltage under which the corresponding laser can work, and the laser is driven after an addition operation is performed on the bias voltage and the driving signal $i_{sig}$.

1.2) each laser generates adiabatic chirp according to changes in the driving signals $i_{sig}$ to cause frequency modulation, with frequency modulation $\Delta f(t)=\gamma\Delta i(t)$, where $\gamma$ is the chirp coefficient of frequency modulation, and the frequency change is shown in (f) in FIG. 4; the frequency change causes the phase change $\Delta\Phi=2\pi\int\Delta f(t)dt=2\pi\gamma\int\Delta i(t)dt$, and the phase shifts are 0, $\pi/2$, $\pi$ and $3\pi/2$ respectively, as shown in (g) in FIG. 4, so that the phase modulation of the optical signals is realized, and QPSK high-speed optical signals are output;

1.3) the optical filters make the frequencies corresponding to the high-level signals in the modulated QPSK high-speed optical signals approach the transmission peak, and filter out the frequencies corresponding to the low-level signals, thus improving the extinction ratio of the signal;

1.4) each pulse shear is driven by an n/2 GHz clock signal clock, which is synchronized with the driving signal $i_{sig}$, and functions to: (1) retain optical signals waveform at the end of the symbol, the optical phase information within the symbol being fully concentrated at the end of the symbol; and (2) delete unwanted waveforms at the beginning of the symbol, including phase and power fluctuations that degrade performance. That is, the pulse shearers are configured to delete phase-fluctuating optical signal waveforms and retain phase-stable optical signal waveforms, and the optical signal output by the pulse shear is shown in (h) in FIG. 4;

1.5) the first optical multiplexer multiplexes m n Gbps QPSK high-speed optical signals equally spaced and adjacent in frequency (25 GHz or 50 GHz or 100 GHz . . . ) output by m pulse shearers into one m×n Gbps ultra-high-speed optical signal according to different wavelengths;

1.6) the first optical amplifier performs power amplification on the input m×n Gbps QPSK ultra-high-speed optical signal to meet the optical power requirements of long-distance transmission in space;

1.7) the first optical antenna couples the ultra-high-speed optical signal (fiber optic signal) subjected to power amplification into the space for transmission;

2) high-speed optical signal reception (working process of receiving unit)

2.1) the second optical antenna receives the ultra-high-speed optical signal after long-distance inter-satellite and satellite-to-ground transmission and couples the ultra-high-speed optical signal to the optical fiber.

2.2) the second optical amplifier performs low-noise and high-gain amplification on the ultra-high-speed optical signal coupled to the optical fiber to meet the optical power requirements of back-end detection.

2.3) the periodic optical filter filters out m optical signals at m adjacent frequencies (25 GHz or 50 GHz or 100 GHz . . . ) at equal intervals from the ultra-high-speed optical signal transmitted by the transmitting unit.

2.4) the 90° optical hybrid is configured to perform coherent mixing on the ultra-high-speed optical signal and multiplexed local oscillator light to output four ultra-high-speed mixed optical signals with phases of in-phase 0° and 180°, and quadrature 90° and 270° respectively, and send the ultra-high-speed mixed optical signals with phases of 0°, 180°, 90° and 270° to the four optical demultiplexers respectively; wherein the multiplexed local oscillator light is formed by outputting m paths of local oscillator light by m local oscillator lasers and multiplexing the m paths of local oscillator light according to different wavelengths;

2.5) the four optical demultiplexers are respectively a first optical demultiplexer, a second optical demultiplexer, a third optical demultiplexer and a fourth optical demultiplexer, and are configured to respectively receive the four ultra-high-speed mixed optical signals with phases of 0°, 180°, 90° and 270°; each optical demultiplexer demultiplexes the received m×n Gbps ultra-high-speed mixed optical signal into m n Gbps high-speed mixed optical signals according to different wavelengths;

2.6) each balanced photodetector group includes a first balanced photodetector and a second balanced photodetector; the first balanced photodetectors of the m balanced photodetector groups are configured to respectively receive m high-speed mixed optical signals (high-speed mixed optical signals with a phase of) 0° output by the first optical demultiplexer and m high-speed mixed optical signals (high-speed mixed optical signals with a phase of) 180° output by the third optical demultiplexer and convert the high-speed mixed optical signals into high-speed mixed electrical signals for output; the second balanced photodetectors of the m balanced photodetector groups are configured to respectively receive m high-speed mixed optical signals (high-speed mixed optical signals with a phase of) 90° output by the second optical demultiplexer and m high-speed mixed optical signals (high-speed mixed optical signals with a phase of) 270° output by the fourth optical demultiplexer and convert the high-speed mixed optical signals into high-speed mixed electrical signals for output;

2.7) each analog-to-digital converter (ADC) is configured to convert the high-speed mixed electrical signal output by the corresponding balanced photodetector group into a digital signal;

2.8) the digital signal processor receives the digital signal output by the analog-to-digital converter, and performs processing such as front-end compensation, timing recovery, polarization tracking, frequency estimation, phase estimation, and decision to recover a baseband electrical signal, and outputs a high-speed electrical signal;

the digital signal processor also obtains an error signal according to a frequency difference after the ultra-high-speed optical signal is mixed with the multiplexed local oscillator light;

2.9) the Doppler shift compensator adjusts the central wavelengths of the local oscillator lasers to compensate the optical wavelength drift of the transmitting unit caused by the inter-satellite and satellite-to-ground Doppler shift according to the error signal obtained by the digital signal processor;

2.10) the second optical multiplexer multiplexes the m paths of local oscillator light output by the m local oscillator lasers into one path of multiplexed local oscillator light according to different wavelengths, inputs the multiplexed local oscillator light into the 90° optical hybrid, and provides the local oscillator light corresponding to signal light to the 90° optical hybrid, so that the digital signal processor outputs an error-compensated high-speed electrical signal.

The above only describes the preferred embodiments of the present disclosure, and does not limit the technical solution of the present disclosure thereto, and any variations made by those skilled in the art on the basis of the main technical idea of the present disclosure belong to the technical scope of the present disclosure.

What is claimed is:

1. A multi-modulation-format compatible space laser communication method based on direct modulation, comprising the following steps:

1) high-speed optical signal transmission, comprising:

1.1) receiving a plurality of high-speed electrical signals, and processing the plurality of high-speed electrical signals to generate a plurality of driving signals capable of realizing phase signal modulation, and outputting a plurality of direct-current bias voltages and a plurality of synchronous clocks;

driving a plurality of lasers after an addition operation is performed on the direct-current bias voltages and the plurality of driving signals, wherein a number of the lasers, a number of the driving signals, a number of the direct-current bias voltages and a number of the synchronous clocks are all equal to a number of the high-speed electrical signals, and the lasers, the driving signals, the direct-current bias voltages and the synchronous clocks are in one-to-one correspondence;

1.2) generating, by each laser, adiabatic chirp according to changes in the corresponding driving signal to cause frequency modulation to realize phase modulation of optical signals according to the frequency modulation, and outputting the modulated high-speed optical signals;

1.3) filtering out frequencies corresponding to low-level signals in all the modulated high-speed optical signals;

1.4) retaining phase-stable optical signals in the modulated high-speed optical signals according to the synchronous clocks; and 1.5) multiplexing all the high-speed optical signals into one ultra-high-speed optical signal, and coupling the ultra-high-speed optical signal to space; and 2) High-speed optical signal reception, comprising:

2.1) receiving the ultra-high-speed optical signal from space, filtering out a plurality of optical signals from the ultra-high-speed optical signal, and inputting the filtered ultra-high-speed optical signal to a 90° optical hybrid;

2.2) performing, by the 90° optical hybrid, coherent mixing on the filtered ultra-high-speed optical signal from multiplexed local oscillator light to output four ultra-high-speed mixed optical signals with phases of 0°, 90°, 180°, and 270°, respectively, wherein the multiplexed local oscillator light is formed by multiplexing output light from a plurality of local oscillator lasers, and a number of the local oscillator lasers is equal to the number of the high-speed electrical signals in step 1.1);

2.3) receiving, by four optical demultiplexers, the four ultra-high-speed mixed optical signals with phases of 0°, 90°, 180° and 270°, respectively, and demultiplexing each ultra-high-speed mixed optical signal into a plurality of high-speed mixed optical signals according to different wavelengths, wherein a number of the plurality of high-speed mixed optical signals is equal to the number of the high-speed electrical signals in step 1.1);

2.4) receiving, by a plurality of balanced photodetector groups, one high-speed mixed optical signal from each of the four optical demultiplexers, respectively, performing photoelectric conversion on the high-speed mixed optical signals and outputting corresponding mixed electrical signals, wherein a number of the balanced photodetector groups is equal to the number of the high-speed electrical signals in step 1.1);

2.5) converting the mixed electrical signals output by the plurality of balanced photodetector groups into digital signals, processing, by a digital signal processor, the digital signals to recover baseband electrical signals, and outputting high-speed electrical signals, wherein the digital signal processor further obtains an error signal according to a frequency difference after the ultra-high-speed optical signal is mixed with the multiplexed local oscillator light; and 2.6) adjusting central wavelengths of the local oscillator lasers in step 2.2) according to the error signal, so that the digital signal processor outputs an error-compensated high-speed electrical signal.

2. The multi-modulation-format compatible space laser communication method based on direct modulation according to claim 1, wherein in step 1.5), the ultra-high-speed optical signal is subjected to power amplification, and the ultra-high-speed optical signal subjected to power amplification is coupled to space through an optical antenna.

3. The multi-modulation-format compatible space laser communication method based on direct modulation according to claim 2, wherein step 2.1) specifically comprises: receiving the ultra-high-speed optical signal, after inter-satellite or satellite-to-ground transmission, from space through the optical antenna, performing low-noise and high-gain amplification on the ultra-high-speed optical signal and then inputting the ultra-high-speed optical signal subjected to low-noise and high-gain amplification to the 90° optical hybrid.

4. The multi-modulation-format compatible space laser communication method based on direct modulation according to claim 1, wherein in step 2.2), the ultra-high-speed mixed optical signals with phases of 0° and 180° are in-phase, and the ultra-high-speed mixed optical signals with phases of 90° and 270° are in quadrature.

5. A multi-modulation-format compatible space laser communication system based on direct modulation, comprising: a transmitting unit and a receiving unit, wherein;

the transmitting unit comprises m signal processors, m lasers, m optical filters, m pulse shearers, and a first optical multiplexer, wherein m is an integer greater than 1;

the m signal processors are configured to receive m high-speed electrical signals, process the high-speed electrical signals to generate driving signals capable of implementing phase signal modulation, and output direct-current bias voltages and synchronous clocks;

the m lasers are configured to generate adiabatic chirp according to the corresponding driving signals and direct-current bias voltages to cause frequency modulation, and perform phase modulation according to the frequency modulation to output modulated high-speed optical signals;

the m optical filters are configured to filter out frequencies corresponding to low-level signals in the modulated high-speed optical signals;

the m pulse shearers are configured to receive the high-speed optical signals processed by the corresponding optical filters and delete phase-fluctuating optical signal waveforms according to the synchronous clocks and retain m phase-stable optical signal waveforms;

the first optical multiplexer is configured to multiplex the optical signals output by the m pulse shearers into one ultra-high-speed optical signal and couple the ultra-high-speed optical signal to space;

the receiving unit comprises a periodic optical filter, a 90° optical hybrid, four optical demultiplexers, m balanced photodetector groups, m groups of analog-to-digital converters, a digital signal processor, a second optical multiplexer, m local oscillator lasers, and a Doppler shift compensator, wherein:

the periodic optical filter is configured to filter out m optical signals from the ultra-high-speed optical signal received from space and input the ultra-high-speed optical signal from which the m optical signals are filtered out to the 90° optical hybrid;

the m local oscillator lasers are configured to output m wavelengths of local oscillator light;

the second optical multiplexer is configured to multiplex the m wavelengths of local oscillator light into one output of local oscillator light and input the multiplexed local oscillator light to the 90° optical hybrid;

the 90° optical hybrid is configured to perform coherent mixing on the ultra-high-speed optical signal from which the m optical signals are filtered out and the multiplexed local oscillator light formed by multiplexing the m paths of local oscillator light to output four ultra-high-speed mixed optical signals with phases of 0°, 90°, 180°, and 270°, respectively;

the four optical demultiplexers are configured to receive four ultra-high-speed mixed optical signals with phases of 0°, 90°, 180° and 270°, respectively, wherein each optical demultiplexer is configured to demultiplex the received ultra-high-speed mixed optical signal into m high-speed mixed optical signals according to different wavelengths;

the m balanced photodetector groups are configured to receive one high-speed mixed optical signal from each of the four optical demultiplexers perform photoelectric conversion on the high-speed mixed optical signals and output corresponding mixed electrical signals;

the m groups of analog-to-digital converters are configured to convert the mixed electrical signals output by the plurality of balanced photodetector groups into digital signals send the digital signals to the digital signal processor, process the digital signals to recover baseband electrical signals, and output high-speed electrical signals;

the digital signal processor is configured to obtain an error signal according to a frequency difference after the ultra-high-speed optical signal is mixed with the multiplexed local oscillator light; and the Doppler shift compensator is configured to adjust center wavelengths of the local oscillator lasers according to the error signal.

6. The multi-modulation-format compatible space laser communication system based on direct modulation according to claim 5, wherein the four optical demultiplexers are respectively a first optical demultiplexer, a second optical demultiplexer, a third optical demultiplexer, and a fourth optical demultiplexer, and are configured to receive the four ultra-high-speed mixed optical signals with phases of 0°, 90°, 180°, and 270°, respectively;

each balanced photodetector group comprises a first balanced photodetector and a second balanced photodetector;

the first balanced photodetectors of the m balanced photodetector groups are configured to receive m high-speed mixed optical signals output by the first optical demultiplexer and m high-speed mixed optical signals output by the third optical demultiplexer and convert the high-speed mixed optical signals into high-speed mixed electrical signals for output; and the second balanced photodetectors of the m balanced photodetector groups are configured to receive m high-speed mixed optical signals output by the second optical demultiplexer and m high-speed mixed optical signals output by the fourth optical demultiplexer and convert the high-speed mixed optical signals into high-speed mixed electrical signals for output.

7. The multi-modulation-format compatible space laser communication system based on direct modulation according to claim 6, wherein the transmitting unit further comprises a first optical amplifier and a first optical antenna, the first optical amplifier is configured to perform power amplification on the ultra-high-speed optical signal output by the first optical multiplexer, and input the ultra-high-speed optical signal subjected to power amplification to the first optical antenna;

the first optical antenna is configured to couple the ultra-high-speed optical signal subjected to power amplification to space;

and wherein the receiving unit further comprises a second optical amplifier and a second optical antenna, the second optical antenna is configured to receive the ultra-high-speed optical signal multiplexed by the first optical multiplexer from the space, the second optical amplifier is configured to perform low-noise and high-gain amplification on the ultra-high-speed optical signal received by the second optical antenna, and input the ultra-high-speed optical signal subjected to low-noise and high-gain amplification to the periodic optical filter.

* * * * *